(12) United States Patent
Zhang et al.

(10) Patent No.: US 11,174,591 B2
(45) Date of Patent: Nov. 16, 2021

(54) GREEN LIQUOR CLARIFICATION USING SEDIMENTATION TANK DURING WHITE LIQUOR PREPARATION

(71) Applicant: VALMET AB, Sundsvall (SE)

(72) Inventors: Zicheng Zhang, Tianjin (CN); John Johnson, Peachtree Corners, GA (US); Magnus Ingelman, Solna (SE); Sanchuan Guo, Hammarö (SE)

(73) Assignee: VALMET AB, Sundsvall (SE)

( * ) Notice: Subject to any disclaimer, the term of this patent is extended or adjusted under 35 U.S.C. 154(b) by 0 days.

(21) Appl. No.: 16/764,029

(22) PCT Filed: Sep. 20, 2018

(86) PCT No.: PCT/SE2018/050960
§ 371 (c)(1),
(2) Date: May 14, 2020

(87) PCT Pub. No.: WO2019/098899
PCT Pub. Date: May 23, 2019

(65) Prior Publication Data
US 2020/0340179 A1    Oct. 29, 2020

(30) Foreign Application Priority Data
Nov. 17, 2017   (SE) .................................. 1751419-1

(51) Int. Cl.
*B01D 21/24* (2006.01)
*D21C 11/00* (2006.01)
(Continued)

(52) U.S. Cl.
CPC .......... *D21C 11/0078* (2013.01); *B01D 21/01* (2013.01); *B01D 21/06* (2013.01);
(Continued)

(58) Field of Classification Search
CPC .... B01D 21/01; B01D 21/08; B01D 21/2416; B01D 21/2477; B01D 21/2488; D21C 11/0078; D21C 11/0085
(Continued)

(56) References Cited

U.S. PATENT DOCUMENTS

| | | | | |
|---|---|---|---|---|
| 3,338,827 | A | * | 8/1967 | Mausolf ................. B01D 21/08 |
| | | | | 210/195.3 |
| 3,772,187 | A | * | 11/1973 | Othmer ..................... C02F 3/26 |
| | | | | 210/195.3 |

(Continued)

FOREIGN PATENT DOCUMENTS

| | | |
|---|---|---|
| CN | 103469664 B | 9/2015 |
| EP | 1 057 510 A1 | 12/2000 |

(Continued)

OTHER PUBLICATIONS

Extended European Search Report, Application No. 18877690.0, dated Jul. 30, 2021, 8 pages.

*Primary Examiner* — Christopher Upton
(74) *Attorney, Agent, or Firm* — Foley & Lardner LLP

(57) ABSTRACT

The invention relates to a method for clarification of raw green liquor in a sedimentation tank. According to the invention is a part of dregs separated in the sedimentation tank recirculated back into the inflow of raw green liquor, and preferably after passing the dregs through at least one turbulence generator (30, 31) that could break up larger dregs particles into smaller dregs particles, and thus create larger total surface on the dregs particles, improving sedimentation rate in the sedimentation tank. In a preferred embodiment is the recirculated dregs added into the flow of raw green liquor before a flocculant is added into the flow of raw green liquor and mixed recirculated dregs.

10 Claims, 6 Drawing Sheets

(51) Int. Cl.
*B01D 21/01* (2006.01)
*B01D 21/06* (2006.01)

(52) U.S. Cl.
CPC ..... *B01D 21/2416* (2013.01); *B01D 21/2422* (2013.01); *B01D 21/2427* (2013.01); *B01D 21/2433* (2013.01); *B01D 21/2472* (2013.01); *B01D 21/2477* (2013.01); *B01D 21/2488* (2013.01); *D21C 11/0085* (2013.01)

(58) Field of Classification Search
USPC ......... 210/195.3, 520, 528, 532.1, 800, 803, 210/805
See application file for complete search history.

(56) References Cited

U.S. PATENT DOCUMENTS

| | | | | |
|---|---|---|---|---|
| 5,143,625 A | * | 9/1992 | Ballard | B01D 21/01 210/195.3 |
| 5,478,468 A | * | 12/1995 | Deno | B01D 21/01 210/520 |
| 5,605,636 A | * | 2/1997 | Wyness | B01D 21/2416 210/195.3 |
| 5,628,875 A | | 5/1997 | Liden et al. | |
| 6,334,952 B1 | | 1/2002 | Hayakawajp et al. | |
| 6,500,344 B1 | * | 12/2002 | Lee | B01D 24/08 210/532.1 |
| 8,741,072 B2 | * | 6/2014 | Eia | E21B 21/01 210/803 |
| 2009/0050570 A1 | * | 2/2009 | Sauvignet | C02F 1/5281 210/195.3 |
| 2011/0100931 A1 | * | 5/2011 | Lake | B01D 21/2488 210/800 |

FOREIGN PATENT DOCUMENTS

| | | |
|---|---|---|
| JP | 2000-176208 A | 6/2000 |
| JP | 2006-265747 A | 10/2006 |
| JP | 2007-138336 A | 6/2007 |

* cited by examiner 500 ml 1# + 3ppm polymer 250 ml 1# + 250 ml 2# + 3ppm polymer 200 ml 1# + 300 ml 2# + 3ppm polymer 500 ml 1# + 40 ml 3# + 3ppm polymer 500 ml 1# + 25 ml 3# + 3ppm polymer 450 ml sample #1 (TSS 658 mg/l) + 38 ml sample #3 + 1 ppm polymer 450 ml sample #1 + 120 ml sample #4 + 1 ppm polymer

GREEN LIQUOR CLARIFICATION USING SEDIMENTATION TANK DURING WHITE LIQUOR PREPARATION

TECHNICAL FIELD

The invention relates to clarification of green liquor, using a sedimentation tank.

BACKGROUND OF THE INVENTION

Several solutions have been presented for clarification of green liquor in the recovery island of a pulp mill. In the following parts, the most common prior art techniques are described briefly, and more details of the different methods can be taught from "Chemical Pulping", Book 6B, Chapter 14/White liquor preparation, ISBN952-5216-06-3 (book 6).

A conventional method of green liquor purification utilizes a sedimentation technique, where the heavy particles, in the form of dregs, settle towards the bottom of large settling tanks, using the density difference between the dregs and the green liquor. The overflow obtained from these settling tanks is the clarified green liquor, and the underflow (from bottom of the tank) contains the settled dregs content. However, these sedimentation tanks need to be quite large, and often integrated with a green liquor storage capacity of about twelve hours.

These settling tanks have been improved further by adding various flocculants to increase sedimentation rate, and often polymeric flocculants are used when production rate of clarified green liquor needs to be increased, or when a smaller less expensive settling tank is considered in new mill projects.

Another method of green liquor purification uses filters, often in form of disc filters even if drum filters are also used. The filtering technique requires a filter that is far more expensive than a standard settling tank, but often better green liquor clarity can be obtained than by standard settling tanks. The separation of dregs from the raw green liquor is obtained by applying a pressure differential over the filter surface, and the filter surface needs to have a precoat of better defined lime mud particles to obtain sufficient filterability.

Yet another method of green liquor purification uses cross-flow filters of the candle type, where a steady high-volume flow of raw green liquor is flushed over a tube-like filter elements, and a cake of dregs is formed over the candle filter elements until the pressure drop over the filter cake becomes excessive. This results in an effective filtering cycle of about one hour, that ends with a back blow releasing the cake with dregs formed on the candle filters. To keep the high volumetric flow over the filter surface, a large volume of the underflow, i.e. unfiltered green liquor, is typically recirculated back to the inlet.

SUMMARY OF THE INVENTION

In the following parts, the following terminology is used: the term "raw green liquor" stands for a raw green liquor obtained from a dissolver where melt from a recovery boiler is dissolved in process water, and can be stored temporarily in an equalizing tank for the purpose of controlling an even flow to following process steps; and the term "flocculant of a polymer type" stands for any kind of polymeric flocculant used to increase sedimentation rate, and can, for example, be a polyamine [PY] or a polyacrylamide [PC] that are charged in small ppm dosages to the sedimentation tank. A company like Kurita sells these flocculants under the product names KURIVERTER CP-350 and KURIFLOCK PA-322, or PA-322K.

The general objective of the invention is to obtain an improved method for increased sedimentation rate in a sedimentation tank for clarification of raw green liquor emanating from a smelt dissolver in the recovery process of a pulp mill.

The inventive method for clarification of raw green liquor applies to raw green liquor fed to a sedimentation tank through a mixing chamber with a multitude of lower outlets that provide for an even distribution of the raw green liquor at a low flow velocity in the lower half of the sedimentation tank via a rotating distributor sweeping over the cross section of the sedimentation tank. In these sedimentation tanks, it is of outmost importance that the inflow of raw green liquor does not cause a stirring action in the upper layer of clarified green liquor. The upper layer of clarified green liquor raises due to difference in the density of the green liquor and the dregs, which dregs have a higher density and thus settle towards the bottom. Said sedimentation tank is further equipped with an underflow outlet in the bottom of the sedimentation tank for settled dregs and an overflow outlet in the upper part of the sedimentation tank for clarified green liquor. The invention is in principle a modification of prior art sedimentation tanks, where a part of the dregs fed out from the underflow outlet is recirculated back to the infeed of raw green liquor.

In previous operations of similar sedimentation tanks, a part of the clarified green liquor has been recirculated, but after tests it has surprisingly been shown that the recirculation of clarified green liquor in fact has a negative effect on the dregs sedimentation and should be avoided, but recirculation of dregs from the underflow outlet in fact has a positive effect on the sedimentation rate.

In a preferred embodiment of the inventive method, the portion of the dregs that is fed out from the underflow outlet can pass at least one turbulence generator, which is able to break up some of the dregs into smaller fractions, before reaching the mixing chamber, thus increasing the total exposed area of the dregs. This improves sedimentation rate even more. The turbulence generator as such can be of different designs, but should add shear force on passing flow of dregs. The turbulence generator can be a centrifugal pump, but can also be a stationary mixer that add a shearing force by sharp deflection of flow, by or passing the flow through a narrow restriction, thereby causing a sudden pressure drop over the restriction.

In a further preferred embodiment of the inventive method, the part of the dregs that is fed out from the underflow outlet can pass at least two turbulence generators, and wherein at least one of the turbulence generators is a pump. This repeated turbulence effect can improve the effect that most of the larger dregs particles have a chance to break up into smaller dregs particles, and can thus improve sedimentation rate even further.

In yet a preferred embodiment of the inventive method, the part of the dregs that is fed out from the underflow outlet can pass at least one centrifugal pump with chopping action on the pumped flow of dregs. The chopping action can be obtained from a mechanical cutting action between an edge in one pumping impeller of the centrifugal pump and a cutting edge of the centrifugal pump housing.

In a preferred embodiment of the inventive method, the recirculated part of the dregs can have a volume ratio versus the volume of raw green liquor in the range 5-30%.

In a further improved embodiment of the inventive method, also a flocculant can be added to the flow of raw green liquor. The dual effect from dregs recirculation and flocculant addition improves sedimentation effect considerably compared to only flocculant addition. Preferably is the flocculant added to the flow of raw green liquor after having been subjected to at least one turbulence generator and before being fed to a mixing chamber in the sedimentation tank.

In a further variant of the inventive method, the flocculant can be added to the flow of raw green liquor and recirculated dregs in the mixing chamber under the influence of a rotating turbine mixer. The recirculated dregs can then be subjected to three mixing effects in total, and the flocculant can be subjected to at least one mixing effect in the mixing chamber, well after the dregs have been thoroughly mixed and broken down to smaller dregs particles.

In a preferred embodiment, the total amount of flocculant added to the gross flow of raw green liquor and recirculated part of dregs is in the range of 1-5 ppm. Preferably the flocculant is a polymer of the type polyamine or polyacrylamide, and preferably similar to the polymeric flocculant sold under the commercial name Kurita PA-322 K.

SHORT DESCRIPTION OF THE DRAWINGS

In the following schematic drawings are details numbered alike in figures, and details identified and numbered in one figure may not be numbered in other figures in order to simplify figures, where:

DETAILED DESCRIPTION OF THE INVENTION

Figure 1:
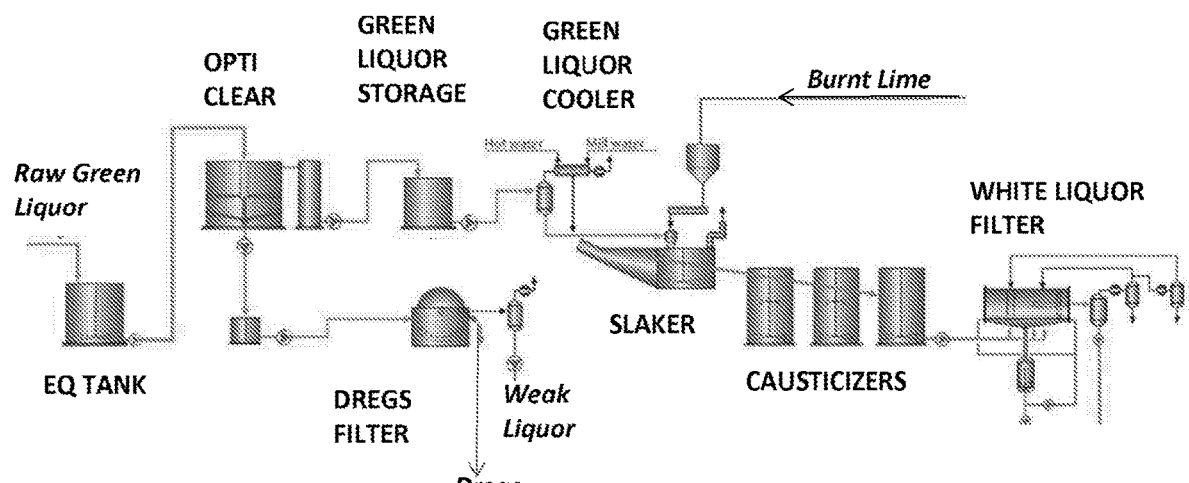
FIG. 1 is a standard set-up with a sedimentation tank for green liquor clarification in the recovery island.

In FIG. 1 is shown a standard set-up with a sedimentation tank for green liquor clarification in the recovery island. The raw green liquor is emanating from a conventional smelt dissolving tank (not shown) where smelt from a recovery boiler is dissolved in some process liquid. The raw green liquor can be stored in an equalizing tank, EQ tank, before being added to the sedimentation tank, here in form of an OptiClear™ sedimentation tank, where dregs are separated in an underflow outlet in the bottom and clear green liquor is fed to an intermediate green liquor storage tank. The dregs from the sedimentation tank are fed to a dregs filter where residual alkaline liquor is washed out as a weak liquor and final dregs with high dryness are obtained ready to be disposed in a land fill. In next step the green liquor is sent to the first stage of conversion to white liquor in the form of a slaker where burnt lime is added to the green liquor. The burnt lime is typically obtained from a lime kiln (not shown). As the process in the slaker is exothermic, most often the green liquor is passing a green liquor cooler ahead of the slaker, thereby avoiding excess temperature in the slaker. Once the burnt lime is added the conversion to white liquor starts, and as the process is time consuming, several causticizing vessels are arranged in series. Once the green liquor has been converted to white liquor, the process liquor is sent to a white liquor filter, where lime mud is separated from the process liquor and a clear white liquor is obtained.

Figure 2:
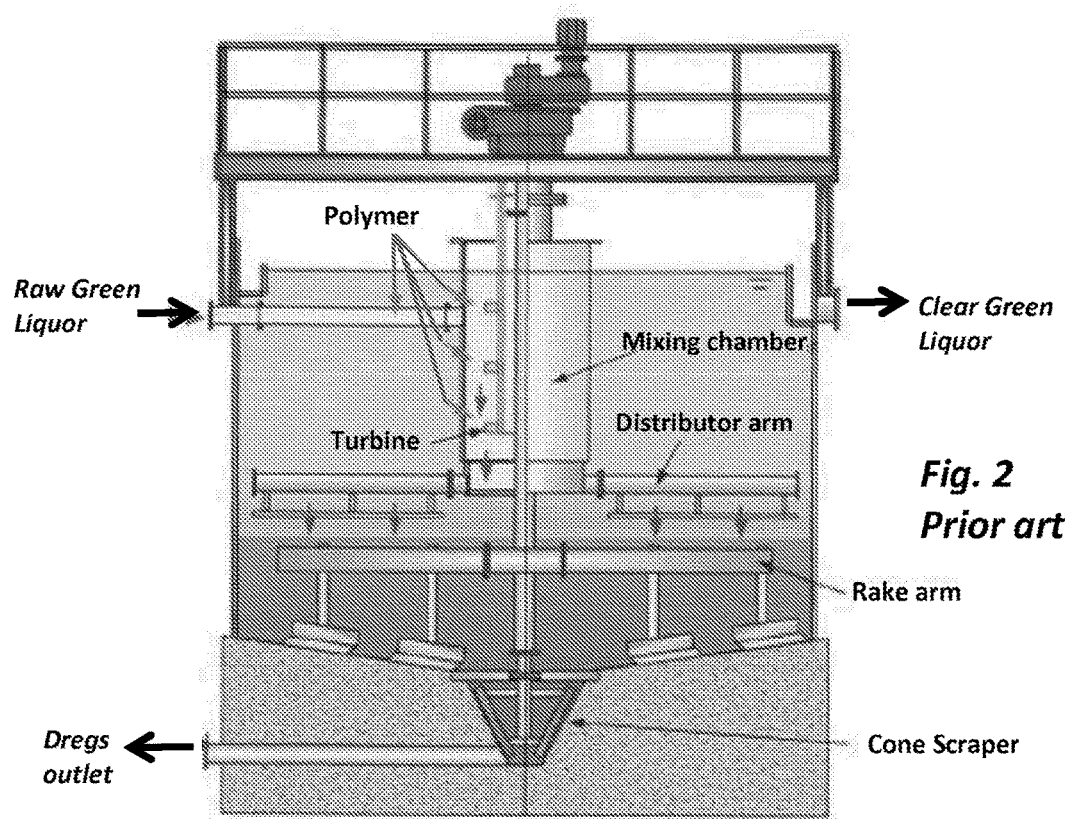
FIG. 2 is a detailed cross-sectional view of the sedimentation tank shown in FIG. 1, sold by Valmet as OptiClear™.

In FIG. 2 is a detailed cross section view of the sedimentation tank shown, sold by Valmet as OptiClear™. The raw green liquor is fed through an inlet ending up in a central mixing chamber that prevents the turbulence from the inflow of raw green liquor to affect the upper sedimentation volume where clear green liquid accumulates. The stationary mixing chamber contains a turbine mixer, seen in the 50% cut-out section of the mixing chamber wall, having at least three impeller blades. During in-feed of raw green liquor is a flocculant/polymer added into the raw green liquor, a first part of the flocculant added already in the feed pipe ahead of the mixing chamber, but also as indicated in several addition positions, here three positions, at different height positions in the mixing chamber. After being subjected to the mixing action of the turbine mixer, the added flocculant/polymer and the raw green liquor are gently dispersed over the entire cross section of the sedimentation tank by rotating distributor arms with an indicated downwardly directed outflow. The sedimentation starts directly below the distributor, and the dregs with higher density settle towards the bottom while the green liquor ascends upwardly due to lower density. As the green liquor reaches the upper surface, it flows into a collecting channel running around the outer periphery of the sedimentation tank, and is fed out from the collecting channel in an outlet as clear green liquor. The dregs settling to the bottom are subjected to the sweeping action of a rotating arm provided with a number of rakes that scrape the dregs towards a center outlet, having a further cone scraper to the keep the flow of dregs alive, preventing plug formation, as it finally is fed out in a dregs outlet.

Figure 3:
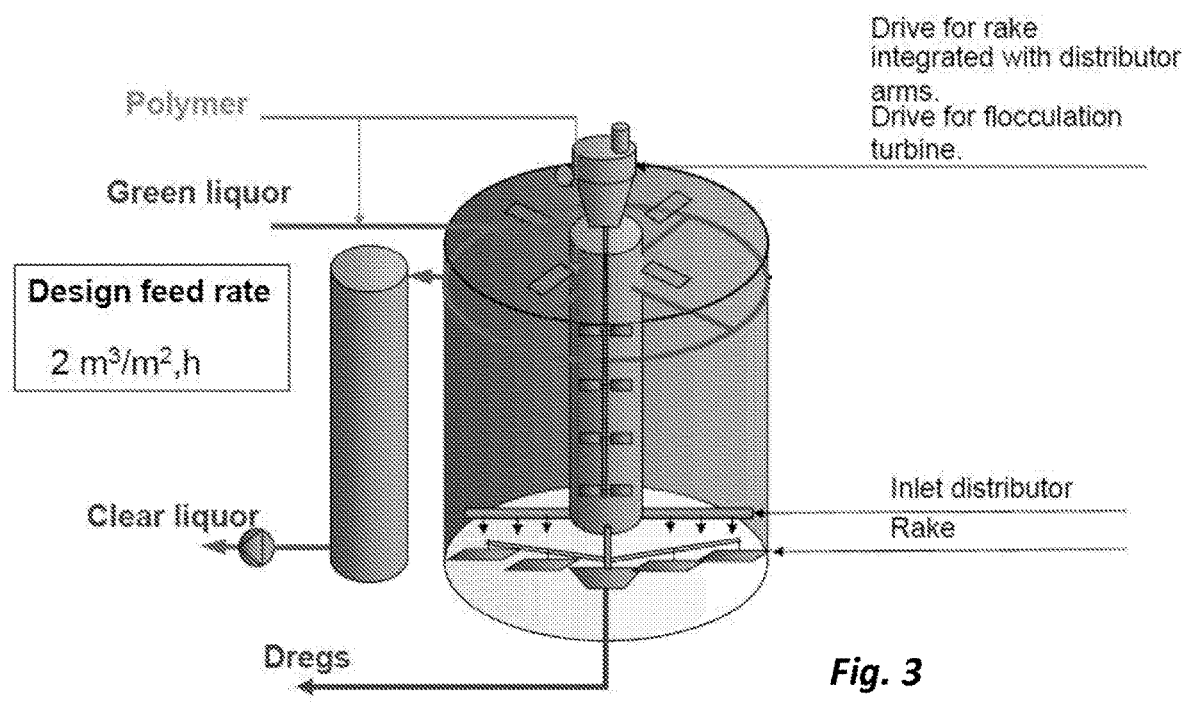
FIG. 3 is an inclined second view of the OptiClear™ as shown in FIG. 2.

In FIG. 3 is shown an inclined second view of the OptiClear™ sedimentation tank for green liquor, and the system is designed for a production capacity of about 2 $m^3/m^2$, h, i.e. 2 $m^3$ of clarified green liquor can be obtained for each square meter of cross section area in the sedimentation tank. As also shown here is the polymer/flocculant added both in the in-feed pipe to the mixing chamber, as well as into the mixing chamber, and the amount of flocculant may lie in the order of 1-5 ppm.

Figure 4:
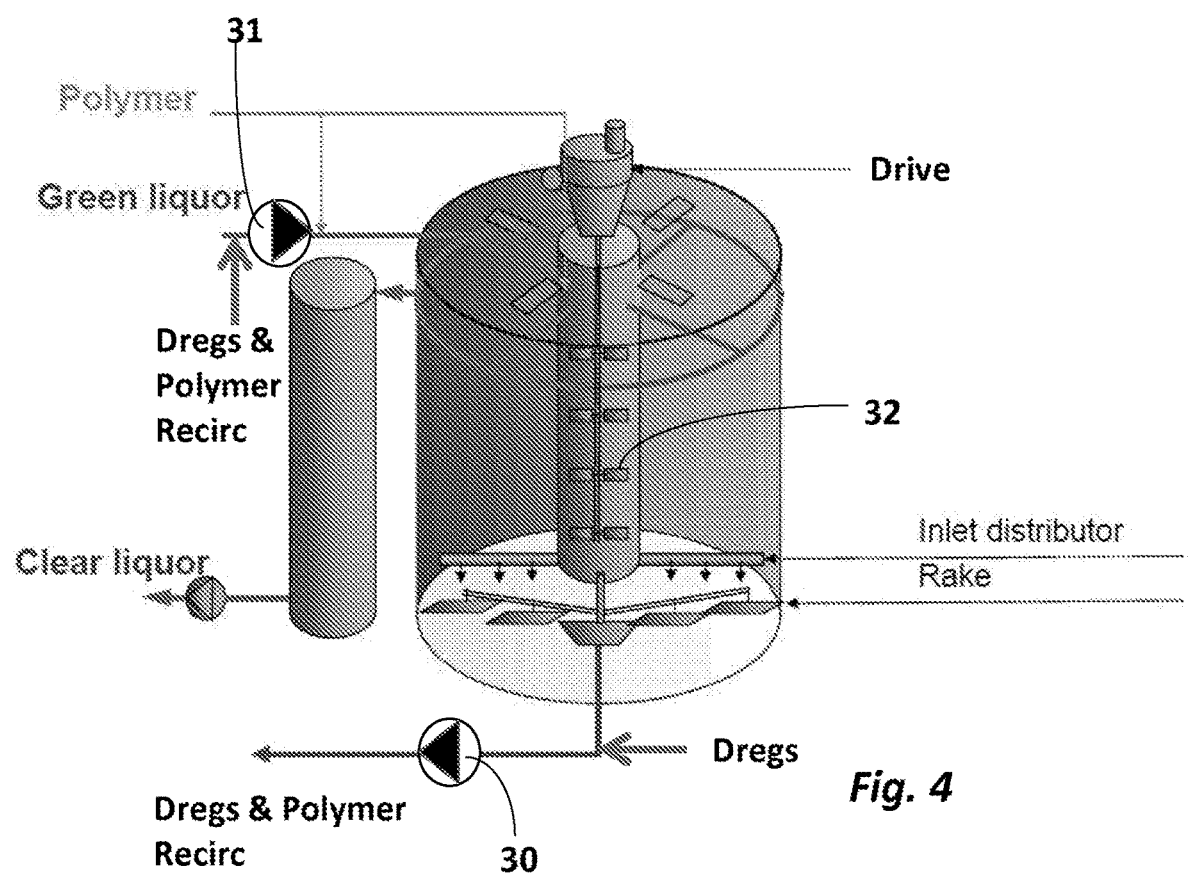
FIG. 4 is similar view as shown in FIG. 3, but with the inventive modification.

In FIG. 4 is a similar view as shown in FIG. 3, but with the inventive modification. The modification consists of adding a pipe for circulating a part of the dregs back to the inflow of raw green liquor. The recirculated flow of dregs can preferably pass a first turbulence generator, here in form of a centrifugal pump 30, that can introduce a mechanical disintegration of larger dregs particles into smaller fractions. Preferably the centrifugal pump 30 has an open impeller with exposed impeller vanes that clash into larger dregs particles and cut them into pieces. Once these dregs particles are disintegrated into smaller fractions, they are reintroduced into the flow of raw green liquor and start as sedimentation surfaces for dry matter in the raw green liquor.

In a later position of the feed pipe, after the introduction of the dregs with reduced particle size, the mixed flow of raw green liquor and particles with reduced size can be subjected to a second turbulence generator that at least provides with a mixing effect, but preferably adds an additional reduction of the particle size of the dregs. As the first turbulence generator, this second turbulence generator can also be a centrifugal pump 31 that introduces a mechanical disintegration of larger dregs particles into smaller fractions. Preferably the centrifugal pump has an open impeller with exposed impeller vanes that clash into larger dregs particles and cut them into pieces.

Once the recirculated dregs with reduced size have passed one or two turbulence generators 30 and 31, the flocculant/polymer is added into the flow, and this last phase mixing is done in order to obtain as much particle growth on the surfaces of the reduced dregs particles, before the flocculant is added.

As shown in FIG. 4, also the turbine mixer 32 in the mixing chamber is adding a final mixing effect before the mixture of raw green liquor and reintroduced dregs particles with reduced size, with any addition of flocculant, are fed out into the lower half of the sedimentation tank.

Tests

In FIGS. 5a to 5g are shown different tests on green liquor clarity obtained from different operational set ups of the OptiClear™ system. The test results are shown as photos in grey-scale that clearly demonstrates the prior processing results with processing results of the invention.

In these tests are different liquids from a recovery process in a Japanese Paper Mill used for simulation of the clarification process, where:

1a: Raw green Liquor from an Equalizing tank ahead of the OptiClear sedimentation tank, (total suspended solids/TSS 810 mg/l);

1b: Raw green Liquor from an Equalizing tank ahead of the OptiClear sedimentation tank, (total suspended solids/TSS 721 mg/l);

1c: Raw green Liquor from an Equalizing tank ahead of the OptiClear sedimentation tank, (total suspended solids/TSS 658 mg/l);

2: Clarified green Liquor from the overflow outlet of the OptiClear sedimentation tank in a process where 3 ppm of flocculant was used;

3: Dregs from the dregs outlet of the OptiClear sedimentation tank using flocculant to the OptiClear sedimentation tank, and thus containing residual flocculant in dregs; and

4; Dregs from the dregs outlet of the OptiClear sedimentation tank using no flocculant to the OptiClear sedimentation tank, and thus no residual flocculant in dregs.

Test 1

This test simulates the clarification results from a process using only raw green liquor with an addition of flocculant. The beaker is filled with 500 ml of #1a liquid, and 3 ppm of flocculant (Kurita PA-322 K) is added. The mixture is agitated at 200 rpm during 30 seconds and is then allowed to settle during 60 seconds. The picture shown in FIG. 5a clearly indicates that a large amount of dregs particles are dispersed in the entire liquid volume above the lower volume of settled dregs.

Test 2

This test simulates the clarification results from a process using prior art recirculation of clarified green liquor at a recirculation rate of 50%. The beaker is filled with 250 ml of #1a liquid, and 250 ml of #2 liquid, and 3 ppm of flocculant (Kurita PA-322 K) is added. The mixture is agitated at 200 rpm during 30 seconds and is then allowed to settle during 60 seconds. The picture shown in FIG. 5b clearly indicates that a larger amount of dregs particles are dispersed in the entire liquid volume above the lower volume of settled dregs, compared to Test 1.

Figure 5A:
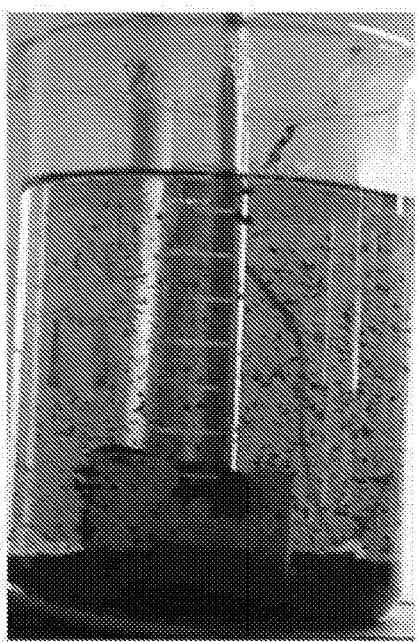
FIGS. 5a-5g show the results on green liquor clarity simulating different operational set-ups of the OptiClear™ system.
Figure 5B:
Figure 5C:

Test 2 was also modified with a smaller recirculation rate, i.e. 20% and a larger recirculation rate, i.e. 60%. The lower circulation rate of 20% resulted in slightly better clarification, but it was still clearly worse than in the no recirculation test. The higher recirculation rate of 60% had the lowest clarification effect than all the other tests with recirculation, as shown in FIG. 5c. The conclusion from Test 1 and Test 2 is that recirculation of clarified green liquor should be avoided.

Test 3 with Inventive Underflow Recirculation

Figure 5D:
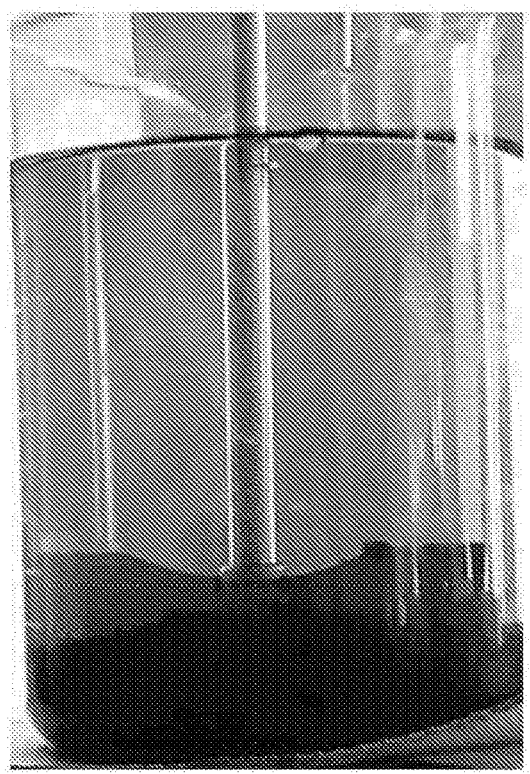

In FIG. 5d is a mixture of 40 ml of liquid #3 added into 500 ml of liquid #1a, with an addition of 3 ppm of flocculant (Kurita PA-322 K). The mixture is agitated at 200 rpm during 30 seconds and is then allowed to settle during 60 seconds. The picture shown in FIG. 5d clearly indicates that best clarification compared to Test 1 and Test 2.

Test 4 with Inventive Underflow Recirculation

Figure 5E:
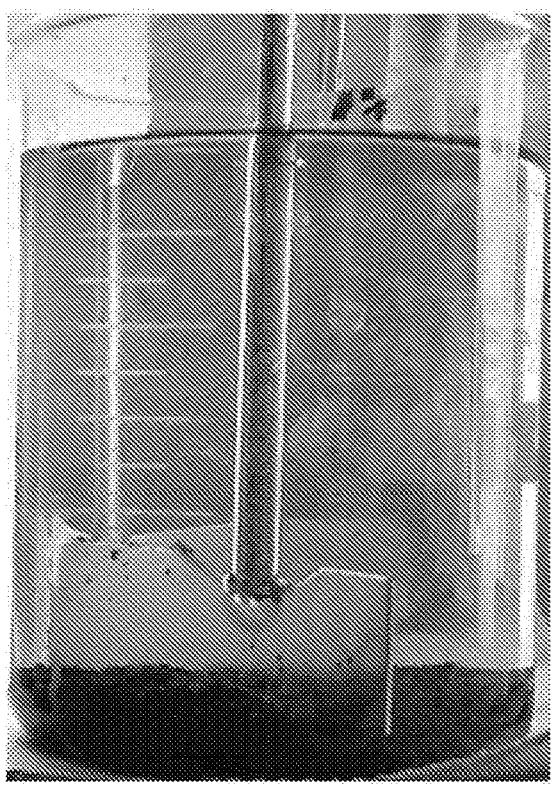

In FIG. 5e is 25 ml of liquid #3 added into 500 ml of liquid #1b, i.e. with a TSS of 721 mg/l instead of the 810 mg/l in liquid #1a, with an addition of 3 ppm of flocculant (Kurita PA-322 K). The mixture is agitated at 200 rpm during 30 seconds and is then allowed to settle during 60 seconds. The picture shown in FIG. 5e clearly indicates same order of clarification as in Test 3, even if the rate of dregs recirculated is somewhat smaller.

Figure 5F:
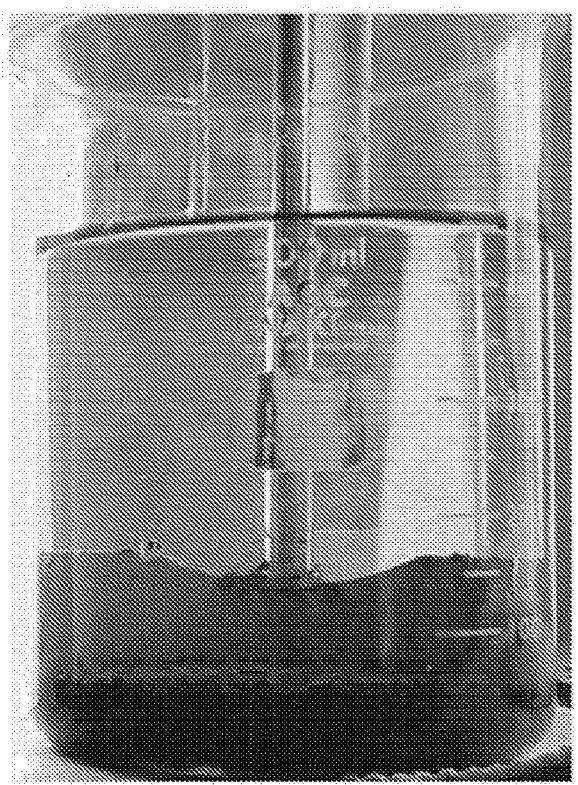

Test 5 with Inventive Underflow Recirculation and Repeated Turbulence and Late Flocculant Addition In FIG. 5f is 38 ml of liquid #3 (dregs with residual flocculant) added into 450 ml of liquid #1c, i.e. with a TSS of 658 mg/l, with an addition of only 1 ppm of flocculant (Kurita PA-322 K). The mixture is pre-agitated without flocculant addition at 200 rpm during 30 seconds and is then allowed to settle during 60 seconds. Then the mixture is subjected to further agitation after addition of the flocculant at 200 rpm during 30 seconds and is then allowed to settle during 60 seconds. The picture shown in FIG. 5e clearly indicates same order of clarification as in Test 3, even if the rate of dregs recirculated is somewhat smaller.

Comparative Test 6 Recirculating Dregs without Residual Flocculant in Dregs.

Figure 5G:
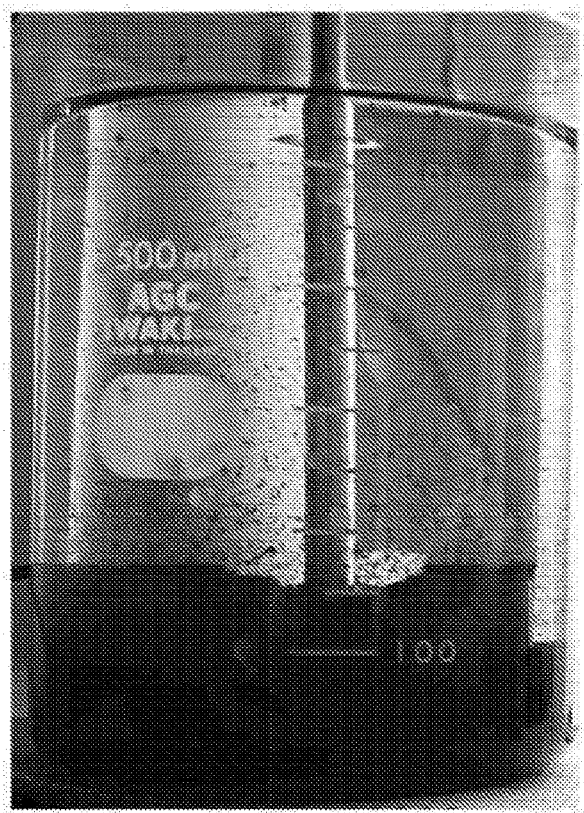

In FIG. 5g is 120 ml of liquid #4 (dregs without residual flocculant) added into 450 ml of liquid #1c, i.e. with a TSS of 658 mg/l, with an addition of only 1 ppm of flocculant (Kurita PA-322 K). The mixture is pre-agitated without flocculant addition at 200 rpm during 30 seconds and is then allowed to settle during 60 seconds. Then the mixture is subjected to further agitation after addition of the flocculant at 200 rpm during 30 seconds and is then allowed to settle during 60 seconds. The picture shown in FIG. 5g clearly indicates that numerous dregs particles are dispersed in the upper liquid volume, but still better clarification than tests without recirculation of dregs.

Conclusions from Tests

The prior art practice to recirculate clarified green liquor has a negative effect on dregs sedimentation. Hence, recirculation of clarified green liquor should not be recommended.

The recirculation of sedimentary dregs into raw green liquor has positive effect on dregs sedimentation and improves clarification in the sedimentation processes.

The recirculation of sedimentary dregs into raw green liquor where said dregs contain residuals of flocculants improves the clarification process further, and enables lower charge of fresh flocculant to the sedimentation process and thus reduce operational costs.

Subjecting the raw green liquor and recirculated dregs for a turbulence effect improves the clarification process further.

The best mode of operation is recirculating dregs from a sedimentation process using flocculant addition, where said dregs have been subjected to a turbulence effect that reduces the particle size and mixing the dregs particles reduced in size with the raw green liquor before addition of flocculant. The dregs recirculated will have a larger total active surface upon which dissolved solids can precipitate on, and with a later addition of flocculant it will speed up the sedimentation process further on dissolved solids that are still dissolved in the liquor.

The invention claimed is:

1. A method for clarification of raw green liquor, comprising:

feeding the raw green liquor to a sedimentation tank through a mixing chamber with a multitude of lower outlets that provide for an even distribution of the raw green liquor at low flow velocity in a lower half of the sedimentation tank via a rotating distributor sweeping over a cross section of the sedimentation tank, said sedimentation tank being equipped with an underflow outlet in a bottom of the sedimentation tank for settled dregs and an overflow outlet in an upper part of the sedimentation tank for clarified green liquor;

recirculating a part of the dregs fed out from the underflow outlet, back to infeed of raw green liquor;

causing the part of the dregs fed out from the underflow outlet, to pass through a first turbulence generator;

causing the part of the dregs having passed through the first turbulence generator, to pass through a second turbulence generator that is directly connected to the first turbulence generator via a pipe; and feeding (1) the raw green liquor and (2) the part of the dregs having passed through the second turbulence generator, to the mixing chamber of the sedimentation tank, wherein the first turbulence generator and the second turbulence generator are configured to break up some of the dregs into smaller fractions, such that a total exposed area of the dregs is increased.

2. A method for clarification of raw green liquor according to claim 1, wherein at least one of the first turbulence generator or the second turbulence generator is a pump.

3. A method for clarification of raw green liquor according to claim 2, wherein the part of the dregs fed out from the underflow outlet passes through at least one centrifugal pump with chopping action on a pumped flow of dregs.

4. A method for clarification of raw green liquor according to claim 1, wherein the recirculated part of the dregs has a volume ratio versus a volume of raw green liquor in the range of 5-30%.

5. A method for clarification of raw green liquor according to claim 1, wherein a flocculant is added to a flow of raw green liquor.

6. A method for clarification of raw green liquor according to claim 5, wherein a flocculant is added to the flow of raw green liquor after having been subjected to a turbulence generator and before being fed to the mixing chamber of the sedimentation tank.

7. A method for clarification of raw green liquor according to claim 1, wherein a flocculant is added to a flow of raw green liquor and recirculated dregs in the mixing chamber under the influence of a rotating turbine mixer.

8. A method for clarification of raw green liquor according to claim 7, wherein a total amount of flocculant added to a gross flow of raw green liquor and recirculated part of dregs is in the range of 1-5 ppm.

9. A method for clarification of raw green liquor according to claim 8, wherein the flocculant is a polymer which comprises polyamine or polyacrylamide.

10. A method for clarification of raw green liquor according to claim 1, further comprising:

causing a mixture of (1) a flow of raw green liquor and (2) the part of the dregs having passed through the first turbulence generator, to pass through the second turbulence generator before being fed to the mixing chamber of the sedimentation tank.

* * * * *